INVENTOR.
PERCY S. GARDNER JR.

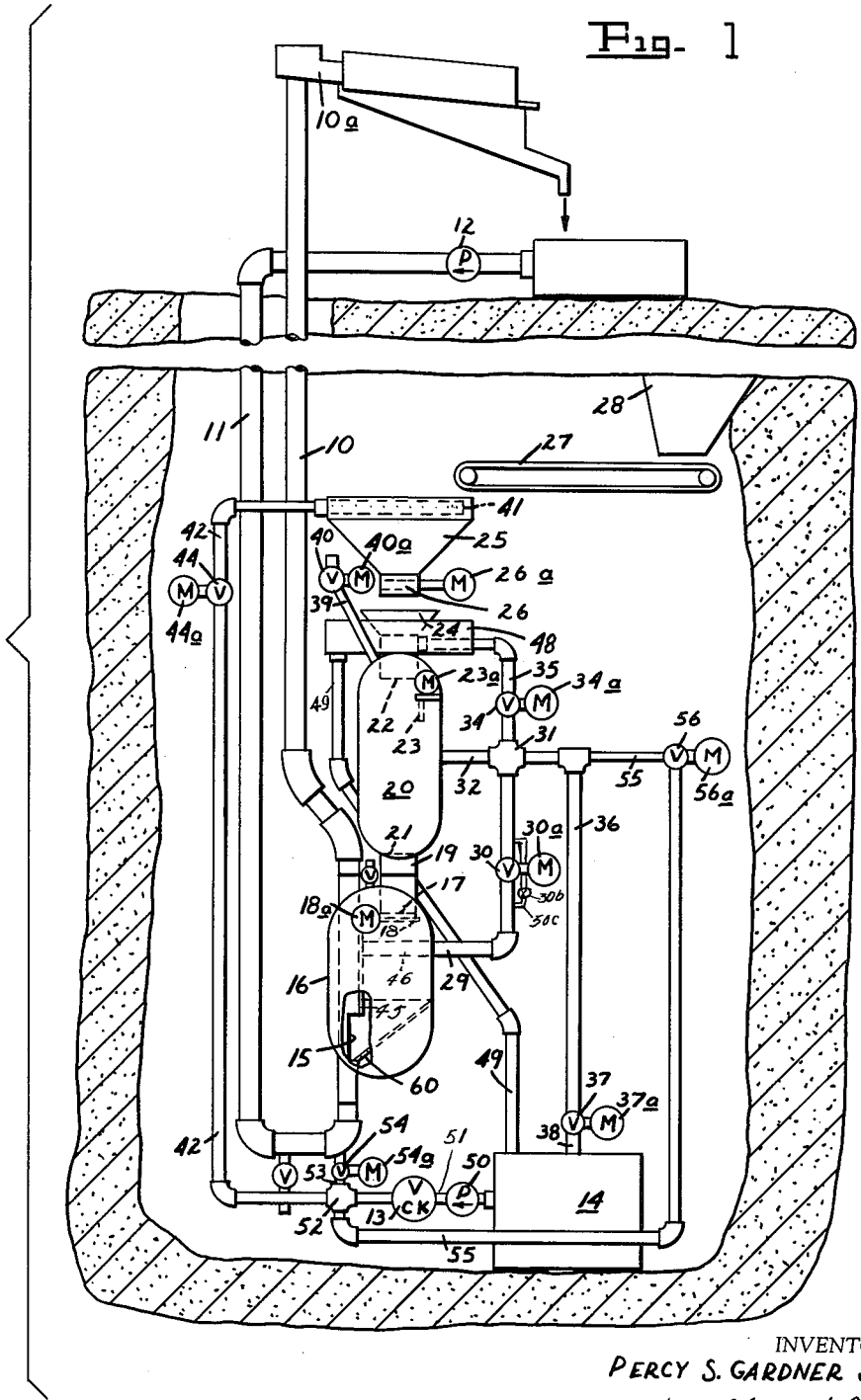

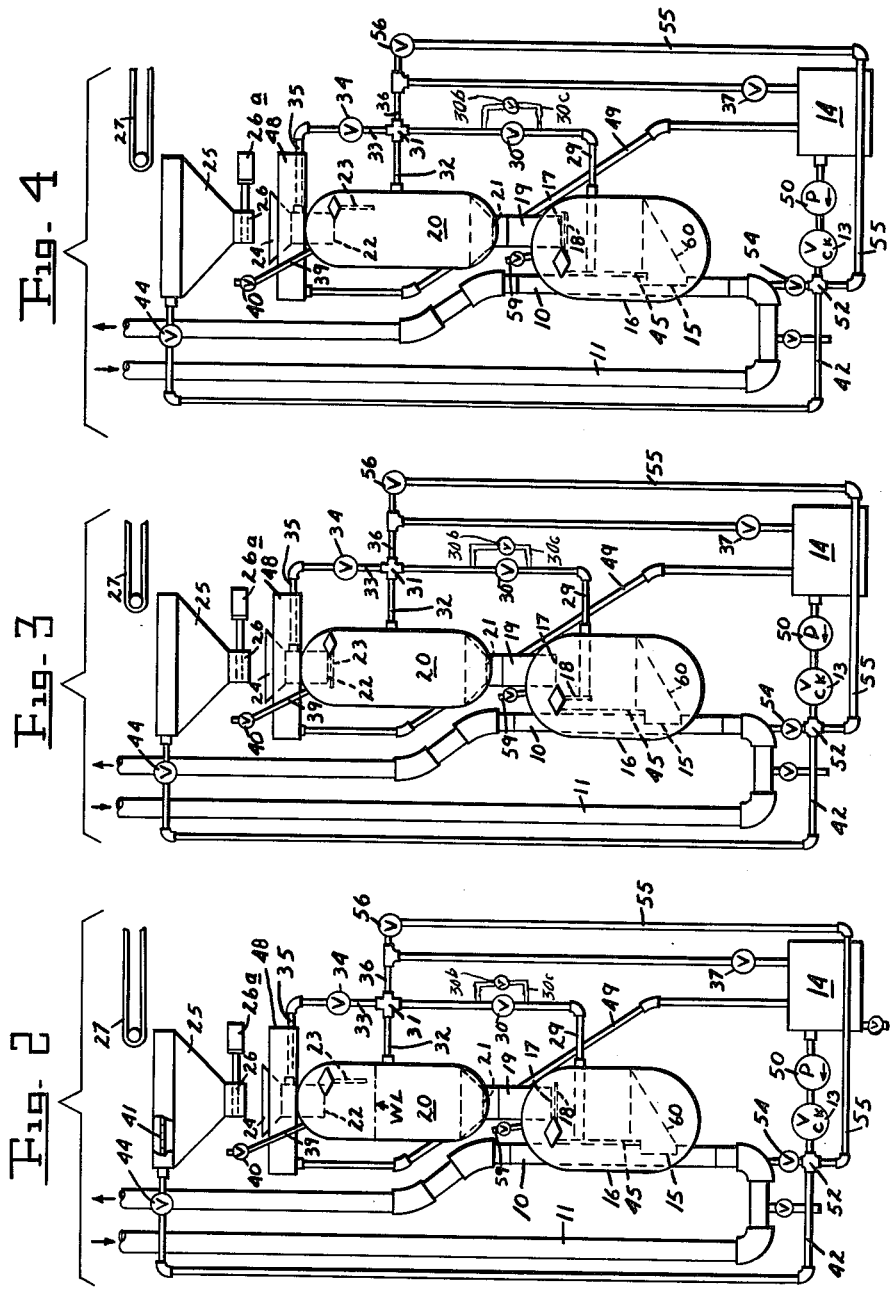

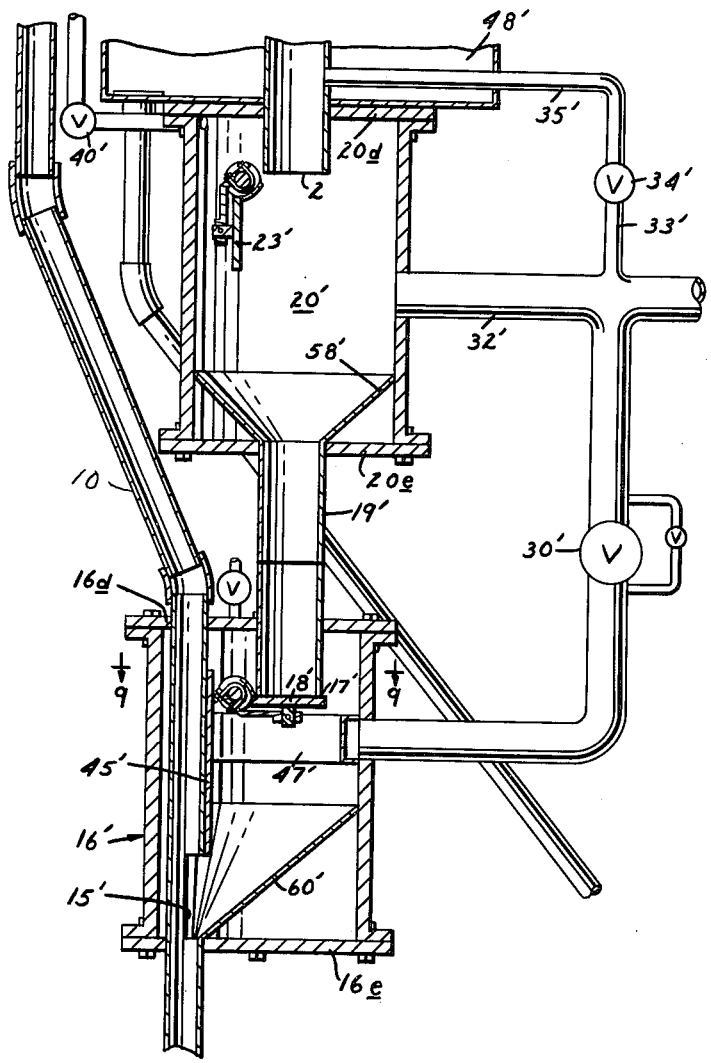

Feb. 1, 1966   P. S. GARDNER, JR   3,232,672
LIFTING SOLID AGGREGATE IN LIQUID STREAM
Filed April 23, 1964   6 Sheets-Sheet 6
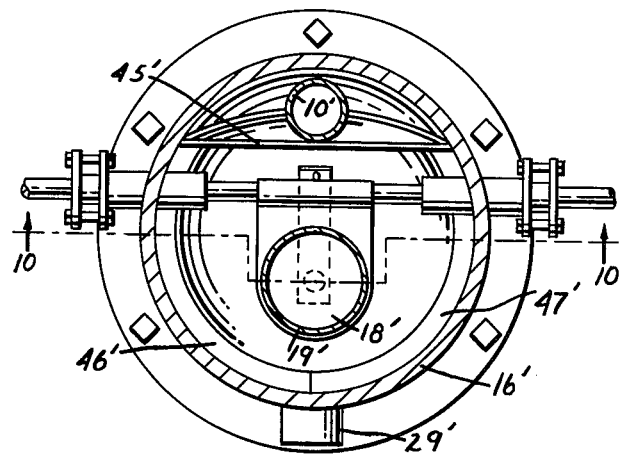
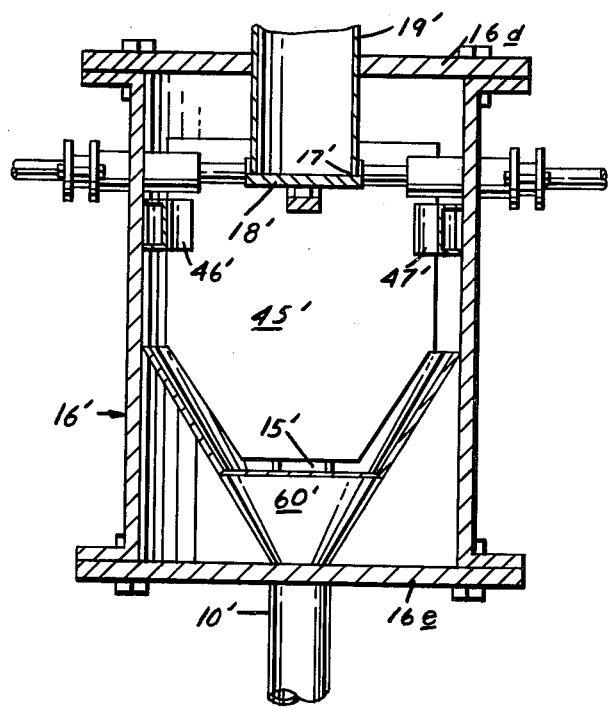
INVENTOR.
PERCY S. GARDNER JR.
BY
ATTYS.

United States Patent Office 3,232,672
Patented Feb. 1, 1966

3,232,672
LIFTING SOLID AGGREGATE IN
LIQUID STREAM
Percy S. Gardner, Jr., 3651 Apollo Drive,
Salt Lake City, Utah
Filed Apr. 23, 1964, Ser. No. 362,138
6 Claims. (Cl. 302—14)

This invention relates to hydraulic lift transport of aggregates of solids such as coal, ore and the like. These aggregates are usually of particle sizes ranging from fine dust upward. They are often abrasive in nature. In the lifting of the aggregates they are handled in the general manner covered in my prior Patent No. 2,793,082. The aggregate is initially placed in a pre-loading chamber at atmospheric pressure then raised to the static pressure existing at that level in the hoisting column and then passed into a loading chamber that is always in communication with the transport column and that directs the aggregate laterally into a high velocity liquid stream which picks up and transports the aggregate.

In this operation the down flow of aggregate has to be replaced by liquid moving up into the pre-load chamber. The reverse flow of liquid at the initial drop does oppose plugging. However, smaller particles and fines are washed up by the reverse liquid flow and their removal from the pre-load chamber can be retarded. I have found that by bypassing liquid from the loading chamber back to the pre-loading chamber through a passage of substantial cross section in comparison to the aggregate passage cross section during the transfer of aggregate from the pre-load chamber to the loading chamber, I can greatly improve the speed and completeness of aggregate transfer. The carrying out of this by-passing is the main purpose of this invention.

It is also the purpose of this invention to provide an improved system whereby to flush out the solids from the pre-load chamber as a part of the cycle of operations.

It is a further purpose of my invention to provide a system wherein the mixing of the aggregate charge transferred from the pre-load chamber to the load chamber with the liquid returned to the pre-load chamber is substantially reduced.

The nature and advantages of my invention will appear more fully from the following description and the accompanying drawings. The drawings and description are intended to illustrate a preferred embodiment of the invention and should not be considered as limiting the invention except insofar as it is limited by the claims.

In the drawings:

FIGURE 1 is a somewhat diagrammatic view of an underground assembly embodying the invention;

FIGURES 2, 3 and 4 are diagrammatic figures illustrating the cycles of operation followed in utilizing the present invention;

FIGURE 8 is a view of a modified form of the apparatus employed;

FIGURE 9 is a sectional view taken on the line 9—9 of FIGURE 8; and

FIGURE 10 is a sectional view taken on the line 10—10 of FIGURE 9.

Figure 5:
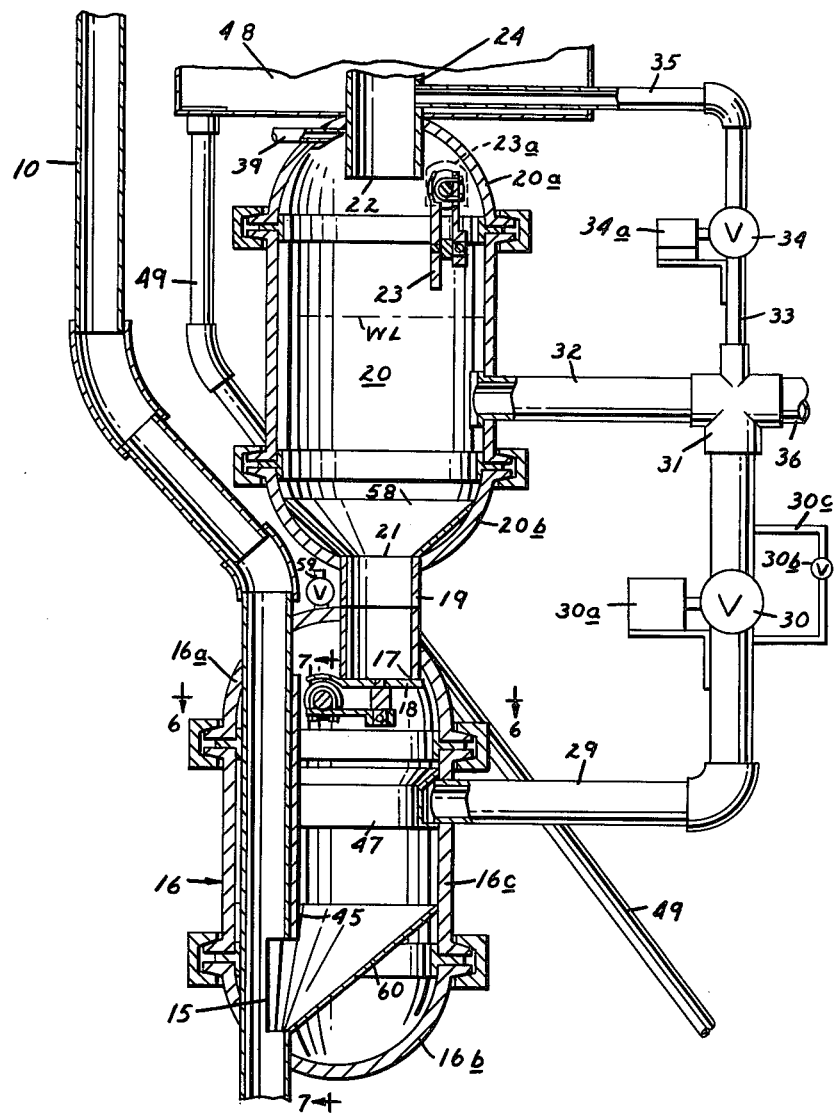
FIGURE 5 is a vertical sectional view through a portion of the apparatus employed.

Referring now to the drawings, the apparatus as shown comprises a tubular hoisting column 10 which is usually supplied with water or other liquid at high velocity from a tubular balancing column 11 having a pump 12 to supply the liquid at the desired rate. As illustrated, there is also a pump 50 taking liquid from a sump 14 and pumping it into the balancing column 11. This latter pump 50 must work against the static head existing at the bottom of the column 11. A check valve 13 is provided to prevent back flow from the column. The hoisting column 10 has a loading window opening 15 in its side wall through which the solid particles of aggregate enter to be carried by the velocity of the liquid in column 10. My present invention is concerned with the system for moving the aggregate to the opening 15.

The column 10 has a loading chamber 16 around the opening 15 arranged with an inclined wall 60 so as to cause the solid particles of aggregate to move toward the opening 15 by virtue of the difference in specific gravity between the liquid and the particles. The liquid in the chamber 16 is relatively quiescent so that the particles tend to roll along an inclined wall 60 into the opening 15. This loading chamber 16 has an inlet at 17 vertically remote from the opening 15 through which the aggregate particles are introduced. A valve 18, in the chamber 16 power operated by a motor 18a outside the chamber 16, swings between a closing position across the inlet 17 and an inlet opening position in the chamber 16. A tube 19 connects the inlet 17 with a pre-loading chamber 20. The chamber 20 has an inlet at 22 remote from its outlet 21 to the tube 19. A valve 23, power operated from without the chamber 20 by a motor 23a, swings between a closing position across the inlet 22 and an inlet opening position within the chamber 20. A tube 24 provides a passage for aggregate particles from a hopper 25 into the chamber 20. The hopper 25 receives its supply of particles from a conveyor 27 which in turn is fed by a hopper 28 or other supply source. The conveyor 27 is stopped during the interval when the hopper 25 is being emptied into the tube 24. The hopper 25 has a bottom gate 26 which is power operated by a motor 26a.

A conduit 29 has one end in communication with the loading chamber 16. The conduit 29 has a valve 30 therein operated by a motor 30a. The conduit 29 goes from the valve 30 to a four-way T connection 31. From this connection one conduit 32 leads to the chamber 20. A smaller conduit 33 connects 31 to a valve 34 operated by a motor 34a and this valve is connected by a conduit 35 to the tube 24 above the inlet 22. Another conduit 36 connects 31 to a valve 37 operated by a motor 37a. A conduit 38 extends from the valve 37 to the sump 14.

It will be noted that the tube 24 extends down into the pre-load chamber 20. A vent pipe 39 opens into the chamber 20 above the lower end of the tube 24. This pipe has a valve 40 in it operated by a motor 40a.

Means are provided to flush out the hopper 25. This means comprises a flushing tube 41 around the inside of the top rim of the hopper 25. This tube has perforations throughout its length so as to wash the entire interior of the hopper when liquid is supplied to the tube. A conduit 42 supplies liquid to the tube 41. A valve 44 in the conduit 42 controls the flow of liquid to the tube 41. The valve 44 is operated by a motor 44a.

The loading chamber 16 is provided with means therein to avoid two of the difficulties that arise when the charge of aggregate is passed from the pre-loading chamber 20 down to the loading chamber 16. A barrier 45 is mounted across the chamber 16 above the opening 15 (see FIGURES 5–7). Two channels 46 and 47 extend along the walls of the chamber 16 from the spaces behind the barrier 45 to the inlet of the conduit 29. These channels and the barrier 45 provide a passage of larger cross-section than the conduit 29 so there is a reservoir of relatively quiescent liquid to feed the replacement liquid from the chamber 16 into the chamber 20, through the conduit 29.

An overflow basin 48 is provided around the tube 24. This basin catches any overflow of liquid due to the charge entering the chamber 20 and the flushing of the hopper 25. A drain pipe 49 carries liquid from the basin 48 to the sump 14. The outlet of pump 50 is connected by a pipe 51 through check valve 13 to a connector 52. From this connector the pipe 42 leads to the valve 44 previously described. Also a pipe 53 having a valve 54 therein leads from the connector 52 to the column 10 below the chamber 16. The valve 54 is controlled by a motor 54a. Another pipe 55 leads from the connector 52 to the pipe 36 adjacent to the connection 31, through a valve 56, which is controlled by a motor 56a. Most of the motors are left off in FIGURES 2, 3 and 4 for the sake of clarity.

At the beginning of a cycle of operation the hopper 25 is supplied with a charge of ore by the feeder conveyor 27. The chamber 20 at this time is partially filled with liquid so as to leave room for a charge of aggregate of a predetermined volume from the hopper 25. This is indicated by the liquid line level WL in FIGURE 2. The valves 23, 40 and 54 are open. The valves 18, 30, 34, 37, 44 and 56 are closed. Liquid is being pumped down column 11 and is rising through column 10 past the opening 15 at the desired velocity. The chamber 16 is always filled with liquid under the static pressure head that results from the height of the column 10 to its discharge outlet at 10a (FIGURE 1).

When the hopper 25 has sufficient charge therein the gate valve 26 is opened and the conveyor 27 is stopped. The charge of aggregate in the hopper 25 drops through the inlet tube 24 and inlet opening 22 to the chamber 20. Liquid rises in the chamber 20 and may rise into the neck of the tube 24 and overflow into the basin 48 depending on the size of the charge in the hopper 25. After the hopper 25 is emptied, the valve 44 is opened to supply liquid to the ring 41 and flush out the hopper 25. Overflow liquid that passes over the flared top of the tube 24 into the basin 48 is drained from the basin 48 through the drain pipe 49 to the sump 14. Any air in the chamber 20 above the inlet 22 escapes through the pipe 39 and the valve 40. Then the valve 44 is closed, the valve 26 is closed and the conveyor 27 is started.

Next the valves 23 and 40 are closed. The chamber 20 is now sealed and contains aggregate and liquid. Then the by-pass valve 30b is opened and a balance of pressure is established between the chamber 16 and 20. Now the valve 18 is opened to permit the aggregate charge to pass by gravity into the chamber 16 through the outlet 21 and tube 19. The aggregate starts to flow into the chamber 16, and liquid tends to flow in a counter direction to replace the aggregate leaving chamber 20. Initially some liquid flows up through the aggregate but valve 30 is opened immediately after valve 18 opens, then the liquid flows up through the channels 46 and 47, pipe 29, valve 30, T-connection 31 and pipe 32 to replace the aggregate leaving chamber 20. During this time the aggregate is going through the opening 15 and up the column 10. Liquid from the column 10 is replacing this aggregate in the chamber 16 and, owing to the circulation set up by the downward movement of the aggregate, this replacement liquid tends to flow into the chamber 20 along the passages provided by the barrier 45, the channels 46 and 47 and the pipes 29, 30 and 32. Flushing of the chamber 20 is carried out after closing of the valve 30 by partially opening the valve 56 and partially closing the valve 54. Pump 50 is in continuous operation. This supplies liquid from the sump 14 to the chamber 20. The sump 14 is made large enough to always have an adequate supply of liquid from which the particles have settled to use for flushing. When the desired flushing is completed the valve 56 is closed and the valve 54 is again opened completely. When valve 56 is closed the valve 18 is then closed to isolate the chamber 20 from the chamber 16.

In order to prepare the chamber 20 to receive another charge of aggregate the valve 34 is opened briefly only after the valves 30, 30b and 56 are closed. Valve 34 is again closed. The opening of valve 34 brings the chamber 20 to atmospheric pressure. Next the valve 23 and the valve 40 are opened. Then valve 37 is thereafter opened to drain down the level of liquid in the chamber 20. The valve 37 is then closed and the apparatus is ready for a new cycle which begins by again opening the hopper gate valve 26.

Figure 6:
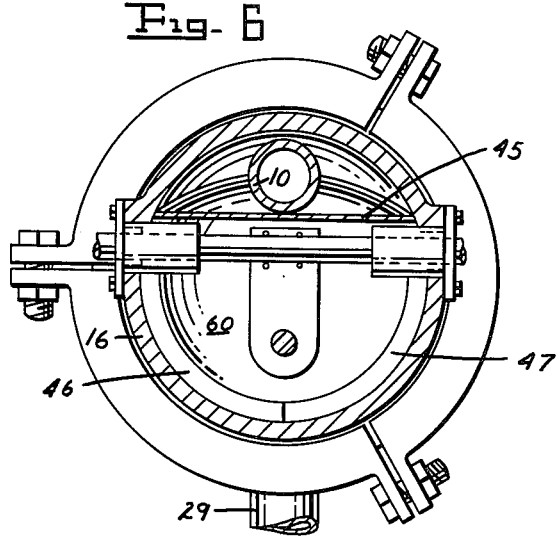
FIGURE 6 is a sectional view taken on the line 6—6 of FIGURE 5.
Figure 7:
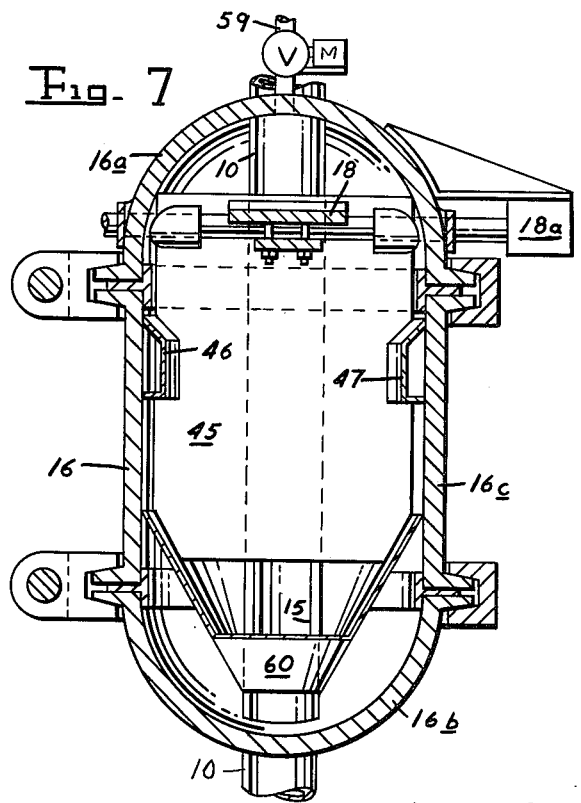
FIGURE 7 is a sectional view taken on the line 7—7 of FIGURE 6.

In FIGURES 5, 6 and 7, there is shown a typical construction for relatively high height hoisting. This design is for 6,000 ft. lift of ore and is constructed to hoist about 500 tons per hour in a 14 inch diameter column using a liquid velocity of 11 ft. per second. The ore has about 2.6 specific gravity and is crushed to pass a six inch screen. The charge per cycle is about 8.7 tons and one minute is allowed per cycle. The ends 16a and 16b of the chamber 16 are made hemispherical for strength and sealed to a cylindrical mid section 16c which carries the parts 45, 46 and 47. The ends 20a and 20b of the chamber 20 are also hemispherical. The conical lining member 58 is used in the chamber 20 to direct the ore into the tube 19. A valved vent 59 is placed in the top of the chamber 16 to draw off any gas that may get into the chamber 16. The lining member 60 receives the falling aggregate and directs this aggregate into the opening 15. The space between the member 58 and the chamber wall 20b is normally filled with liquid so that member 58 does not have to withstand the great pressure difference that exists part of the time between the interior of the chamber 20 and the atmosphere around this chamber. The space between the member 60 and the chamber wall 16b is also filled with liquid for the same reason.

A coupling between the ends of the vessels and the cylindrical portions may be of the type sold under the trademark "Grayloc." Briefly it comprises outwardly extended tapered flanges on the ends and on the cylindrical portion, an inner seal ring of T-shaped cross section, and outer clamping channels which are in sections and drawn together by bolts to wedge the ends against the center portion of the vessel.

In FIGURES 8, 9 and 10 there is shown a typical construction for relatively low height hoisting. This design is for 1400 ft. lift of anthracite coal, hoisting 200 tons per hour, in a 10 inch column with a liquid velocity in the column of about 10 feet persecond. The anthracite coal is crushed to pass through a four inch screen. The specific gravity is about 1.55. The charge per cycle is about 3.33 tons and one minute is allowed per cycle.

The chamber construction in FIGURES 8, 9 and 10 uses flat heads 16d and 16e on the chamber 16' and similar flat heads 20d and 20e on the chamber 20'. In the chamber 20' there is a cone member 58' to direct the aggregate into the tube 19'. Also in the chamber 16' there is a member 60' to direct the aggregate to the opening 15'.

In both forms represented by FIGURES 5, 6 and 7 and FIGURES 8, 9 and 10, the liner members 58, 58', 60 and 60' are replaceable upon removal of the lower ends 16b and 20b, or 16e and 20e respectively. These members are the parts subjected to the most wear since they directly receive the impact of the aggregate particles moving down through the chambers.

Examples of typical cycles of operation in the hoisting of aggregates applicable to the specific structures shown in FIGURES 5, 6 and 7 and to those shown in FIGURES 8, 9 and 10 are the following:

EXAMPLE 1

|  | Seconds |
|---|---|
| (1) Valve 23 is open. Valve 18 is closed. Liquid in chamber 20 is at the level WL (FIGURE 2). To begin the cycle you stop the conveyor 27 and open valve 26 | 1 |
| (2) Charge transfers from hopper 25 to chamber 20 | 3 |
| (3) Flush valve 44 opens and flushes 25 | 3 |
| (4) Flush valve 44 closes, valve 26 closes | 2 |
| (5) Conveyor 27 starts again and valve 23 closes, vent valve 40 closes | 2 |
| (6) Valve 30b opens, valve 18 opens, valve 30 opens | 1 |
| At this point valves 18 and 23 are in the position shown in FIGURE 3. Charge settles from chamber 20 to chamber 16 and replacement liquid flows from chamber 16, partly through tube 19 and partly via valve 30 to chamber 20 | 15 |
| (7) Valves 30 and 30b close | 1 |
| (8) Valve 18 closes | 2 |
| (9) Valve 34 opens and closes to bring chamber 20 to atmospheric pressure | 1 |
| and valves 23 and 40 open | 2 |
| (10) Valve 37 opens | 1 |
| Liquid level in chamber 20 drops (FIGURE 3) as the liquid drains to sump 14 | 4 |
| (11) Valve 37 closes | |
| During all of this time pump 50 and valve 54 are normally open to remove excess liquid from the sump 14. | |
| Total elapsed time | 38 |

EXAMPLE 2

| | |
|---|---|
| Using pump 50 for flushing, first seven steps same as in Example 1—time | 28 |
| (8) Valve 54 partially closes and valve 56 partially opens at the same time so that the pump 50 forces part of the liquid from sump 14 through the valve 56 into chamber 20 | 10 |
| (9) Valve 54 opens fully and valve 56 closes fully | 1 |
| (10) Valve 18 closes | 2 |
| (11) Valve 34 opens and closes | 1 |
| (12) Valves 23 and 40 open | 2 |
| (13) Valve 37 opens | 1 |
| (14) Chamber 20 drains to desired level WL | 4 |
| (15) Valve 37 closes | 1 |
| Total elapsed time | 50 |

Thus in Example 2 above an additional 12 seconds has been added to the cycle to flush out the chamber 20 before re-opening this chamber to atmospheric pressure and drawing down the liquid level therein for the reception of a new charge. The valve 30 should be closed during the flushing. Part of the flushing liquid could otherwise go through the large conduit 29 and not flush the chamber 20.

The large valve 30 is alternately subjected to the full pressure difference between atmosphere and the pressure existing in the chamber 16. To effect a relaxation of the pressure differential across the valve 30 when the chambers 20 and 16 are being equalized, I find it is helpful to install the small pressure equalizing valve 30b in a small by-pass conduit 30c around valve 30. This valve 30b is for equalizing the pressure between chambers 16 and 20 before valves 18 and 30 are opened so that valves 18 and 30 do not have to open against pressure.

It is believed to be clear from the foregoing description that I have a distinctly improved method of hoisting over that disclosed in my prior patent wherein the charge of solid particles in the pre-loading chamber can be moved into the loading chamber with substantially less turbulence and at a faster rate. This is accomplished essentially by the step of directing substantially particle free liquid through the large path (provided by the barrier 45, channels 46 and 47, conduits 29 and 32 and valve 30) from the loading chamber into the upper portion of the pre-loading chamber to fill up the space left in the upper chamber by the particles moving down by gravity through the passageway 19 between the chambers 20 and 16. This reduces the reverse flow of liquid up through the passageway 19 which would have to take place to fill the spaces in chamber 20 vacated by the falling particles. Some initial tendency to reverse flow in the passageway 19 helps to prevent wedging of particles at the bottom of chamber 20. By making the flow capacity of the path around the passageway 19 at least ten percent of the flow capacity of 19 the advantages of low turbulence and fast falling of the particles through 19 are, I have found, obtainable.

In a situation where the specific gravity of the particles of solid aggregate and the specific gravity of the liquid are not far apart, it is desirable to increase the flow capacity of the alternate path around the passageway 19. Viscosity of the liquid also has an influence. Higher viscosity demands an alternate path of larger capacity. For example, in the hoisting of potash containing aggregate or ore using a saturated potash brine as the hoist liquid, the liquid gets rather viscous so the settling of the ore particles is slowed. Under these conditions the flow capacity of the separate path needs to be greater than the minimum specified herein for optimum volume of ore transfer. The separate flushing step of the hoisting operation also becomes more important under these adverse conditions.

To reduce the resistance to flow in the alternate path I can eliminate the channels 46 and 47 and go direct from the space behind the barrier 45 to the conduit 29. Such minor changes are contemplated to meet specific conditions and are considered to be within the scope of the present invention as defined in the following claims.

Having described my invention, I claim:

1. In the feeding of solid particles into a confined high velocity stream of liquid which hoists and transports the aggregate to a higher level wherein the particles are first placed with liquid in a pre-loading chamber at atmospheric pressure, then the pressure in said chamber is raised to the static pressure existing at the level in the hoisting stream after which a passageway is opened from the pre-loading chamber into a loading chamber through which the solids move by gravity, the loading chamber being always in communication with the hoisting stream so that it directs the particles therein laterally into the high velocity stream, that step which comprises:
directing a stream of liquid from the loading chamber to the pre-loading chamber over a path separate from said passageway while the particles are moving through the passageway thereby to supply replacement liquid in the pre-loading chamber to fill the space vacated by the solid particles.

2. The invention defined in claim 1 wherein the replacement stream of liquid is separated from the particles while the particles are moving from the level of the passageway to the hoisting stream.

3. The invention of claim 1 wherein the flow capacity of the replacement stream is at least ten percent of the flow capacity of the passageway.

4. The combination with the method step defined in claim 1 with an additional step wherein the replacement stream is cut off and additional liquid is pumped into the pre-loading chamber thereafter to flush out particles lodged therein prior to isolating the pre-loading chamber from the loading chamber for reception of a new charge of particles.

5. In the feeding of solid particles into a confined high velocity stream of liquid which hoists and transports the aggregate to a higher level wherein the particles are first placed with liquid in a pre-loading chamber at atmospheric pressure, then the pressure in said chamber is raised to the static pressure existing at that level in the hoisting stream after which a passageway is opened from the pre-loading chamber into a loading chamber through which the solids move by gravity, the loading chamber being always in communication with the hoisting stream so that it directs the particles therein laterally into the high velocity stream, that step which comprises:

pumping a supply of liquid from an outside source into the pre-loading chamber while the passageway remains open.

6. In a hoisting apparatus for hoisting solid particles by means of a high velocity liquid stream, the apparatus having an upper pre-loading vessel together with liquid supply and particle supply means to fill the upper vessel with liquid and a charge of particles, a hoisting conduit with means to force liquid upward in said conduit at high velocity, a loading vessel below the pre-loading vessel, the conduit having a side opening and the loading vessel having an inclined wall at the bottom directing falling particles to said side opening, the combination comprising:

a valved conduit leading from the bottom of the pre-loading vessel into the loading vessel through which the particles may fall by gravity into the loading vessel;

a second conduit leading from the upper portion of the pre-loading vessel to an opening into the loading vessel that is out of the path of particles dropping through the loading vessel, said second conduit having a cross section size at least 10% of the cross section;

valve means operable to open and close the second conduit, while the first named conduit is open for the passage of particles therethrough, and thereby pass liquid from the loading vessel to the upper vessel to replace the volume of particles transferred;

the loading vessel having barrier means therein extending upwardly from said side opening providing a liquid passage open to receive liquid from the column at the top of said side opening; and the loading vessel having channels therein leading from said liquid passage to the said second conduit.

References Cited by the Examiner

UNITED STATES PATENTS

| 2,793,082 | 5/1957 | Gardner | 302—14 |
| 2,943,890 | 7/1960 | Hrabovszky | 302—14 |

FOREIGN PATENTS

| 286,044 | 7/1913 | Germany. |

HUGO O. SCHULZ, *Primary Examiner.*

ANDRES H. NIELSEN, *Assistant Examiner.*